(12) United States Patent
Fung et al.

(10) Patent No.: US 6,573,858 B1
(45) Date of Patent: Jun. 3, 2003

(54) TANDEM-CYCLE TARGET/TRACK ASSIGNMENT METHOD IN COMBINED RADAR/ADS SURVEILLANCE ENVIRONMENT

(75) Inventors: Youn-Tih Fung, Taipei (TW); Wu-Ja Lin, Taipei (TW); Yuh-Ming Liu, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 10/026,623

(22) Filed: Dec. 27, 2001

(51) Int. Cl.[7] .............................................. G01S 13/00
(52) U.S. Cl. ............................. 342/36; 342/37; 342/40
(58) Field of Search ........................ 342/36, 37, 38–40

(56) References Cited

U.S. PATENT DOCUMENTS

| | | | | | |
|---|---|---|---|---|---|
| 5,030,960 A | * | 7/1991 | Bartley | ...................... | 342/427 |
| 5,321,406 A | * | 6/1994 | Bishop et al. | ................ | 342/32 |
| 5,381,140 A | * | 1/1995 | Kuroda et al. | ............. | 340/961 |
| 6,047,233 A | * | 4/2000 | Salvatore et al. | ........... | 345/846 |
| 2002/0032528 A1 | * | 3/2002 | Lai | ........................... | 701/301 |
| 2002/0053987 A1 | * | 5/2002 | Chang et al. | .......... | 342/357.01 |

* cited by examiner

Primary Examiner—Thomas H. Tarcza
Assistant Examiner—Isam Alsomiri
(74) Attorney, Agent, or Firm—Bacon & Thomas, PLLC

(57) ABSTRACT

A target/track assignment method for a combined radar/ADS surveillance environment uses tandem cycles to help the air traffic control system update the order of system tracks, thereby permitting numerous target reports to be processed in real time.

15 Claims, 1 Drawing Sheet

TANDEM-CYCLE TARGET/TRACK ASSIGNMENT METHOD IN COMBINED RADAR/ADS SURVEILLANCE ENVIRONMENT

BACKGROUND OF THE INVENTION

1. Field of the Invention

The present invention can be classified to air traffic control, and particularly to a tandem-cycle target/track assignment method in combined radar/ADS surveillance environment.

2. Description of the Related Art

Future radar/ADS combined surveillance environment includes the following facilities: primary radar, secondary radar, Automatic Dependent Surveillance-Addressing (ADS-A), and Automatic Dependent Surveillance-Broadcast (ADS-B). These facilities' report rates are quite different. For example, ADS-B broadcasts every second and, on the other hand, ADS-A sends reports every 15 to 30 minutes, on average. To eliminate problems which might come with the various report rates, current air traffic control system needs a new target/track assignment method to get the latest surveillance information of an aircraft in real time.

In the present invention, a tandem-cycle target/track assignment method is proposed to satisfy this requirement.

SUMMARY OF THE INVENTION

The object of the present invention is to provide a tandem-cycle target/track assignment method in combined radar/ADS surveillance environment so that an air traffic control system can get the latest surveillance information of aircrafts in real time.

The method contains the following steps; (A) determine whether the system should run a batch process. If not, go to (B); otherwise go to (G). (B) filter out improper targets; (C) according to system track's position, velocity, etc., select candidate tracks which might correlate with the reported target; (D) according to the candidate track's type and correlation conditions, further filter candidate tracks selected in (C) and calculate remaining tracks' likelihood values while correlating them with the reported target. Save all likelihood values of track-target pairs for later processing in (G). If no candidate track can be found, initialize a new track using the reported target; (E) determine when should the system update tracks. If in sequential process, go to (F); otherwise go to (G). (F) select a system track which likelihood value is the highest, update it with the reported target, and then go to (A). (G) If it's time to run a batch process, use the auction algorithm to select best track-target pairs and update system tracks with their best targets. Then, go to (A).

The various objects and advantages of the present invention will be readily understood in the following detailed description.

DETAILED DESCRIPTION OF THE INVENTION

Figure 1:
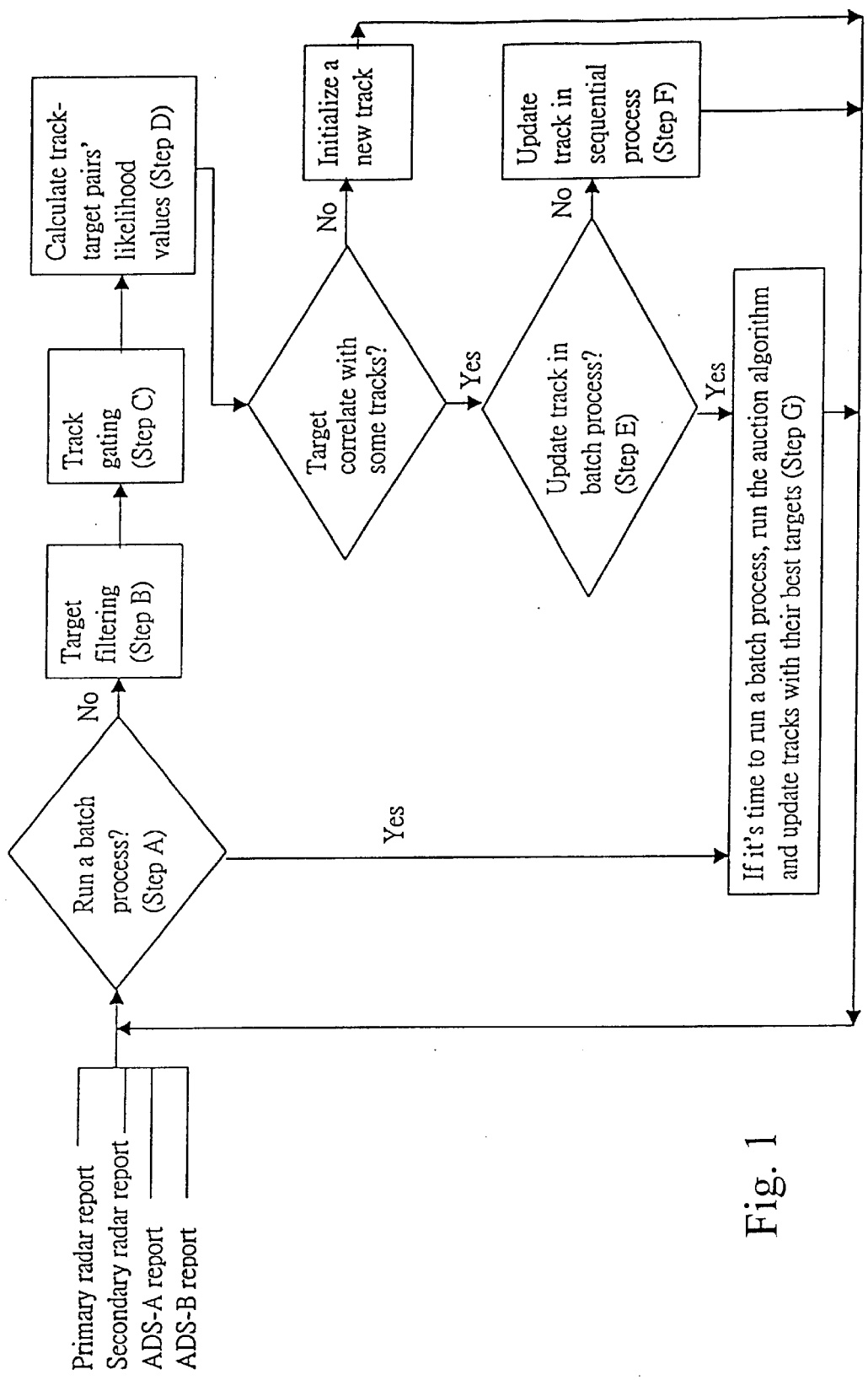
FIG. 1 shows the flow diagram of the proposed method in the present invention.

The flow diagram of the tandem-cycle target/track assignment method of the present invention is illustrated in FIG. 1. The proposed method, when receives a target report, will run the following steps.

Step A. If the system is going to run a batch process, go to Step G; otherwise, go to Step B. Note that a system might run a batch process every 4.5 seconds.

Step B. filter out the received target if
  it is a radar test target,
  its beacon code is invalid,
  it's outside system plane,
  it overloads the system, i.e., the number of targets will exceed system's maximal capacity,
  it is not eligible for correlation
If the target is filtered out, go to Step A.

Step C. select candidate tracks that can reach reported target's position in a reasonable time. On selecting these candidates, their positions, velocities, headings, turn rates, correlation time, etc. are considered.

Step D. Use correlation conditions listed in Table 1 to filter out candidates selected in Step C. Calculate remaining candidate tracks' likelihood values while correlating them with the reported target. On calculating a track's likelihood value, increase the value when
  The distance between the candidate track and the target is small,
  The difference of velocity, heading, or altitude between the candidate track and the target is small.
  The beacon codes of the candidate track and the target are of the same
  The aircraft IDs of the candidate track and the target are of the same
  The candidate track and the target are both reported by the same primary or secondary radar.
On the other hand, decrease the value if the target is reported by a primary radar and is in a clutter area. Save likelihood values of all {(candidate track, reported target)} pairs for later processing in Step G. If no candidate track can be found, initiate a new track using the reported target.

Step E. According to Table 1, determine when should the reported target update a system track. If the target will update a system track in sequential process, go to Step F; if the target will update a system track in batch process, go to Step G.

Step F. Update the system track which likelihood value is the highest. Go to Step A.

Step G. If it's time to run a batch process, use the auction algorithm to determine best track-target pairs for system tracks and update them with their best targets. Go to Step A.

Table 2 explains meanings of various track types listed in Table 1.

TABLE 1 track-target correlation conditions and track update time.

| A target reported by | Track type | Correlation conditions | update track in |
|---|---|---|---|
| primary radar | Search, ADS-search | Track passes the gating in step C. | Batch process |
| | Beacon, accurate | Track passes the gating in step C and (1) track is in coast state; (2) target is not in clutter area; (3) target is reported from preferred radar. | |
| | ADS, ADS-beacon, ADS-accurate | Not allowed | |

TABLE 1-continued track-target correlation conditions and track update time.

| A target reported by | Track type | Correlation conditions | update track in |
|---|---|---|---|
| Secondary radar | Search | Not allowed | |
| | Beacon, ADS-beacon | Track passes the gating in step C and the beacon codes are of the same Or target's beacon code is HIJK or RDOF or EMG. | |
| | Accurate, ADS, ADS-search, ADS-accurate | Track passes the gating in step C and track has not correlated with any beacon target or the beacon codes are of the same or target's beacon code is HIJK or RDOF or EMG. | |
| ADS-B | Search | Not allowed | |
| | Beacon, Accurate, ADS, ADS-search, ADS-beacon, ADS-accurate | Track passes the gating in step C and track's aircraft ID is the same as the target's aircraft ID. | Sequential process |
| ADS-A | Search | Not allowed | |
| | Beacon, Accurate, ADS, ADS-search, ADS-beacon, ADS-accurate | Track passes the gating in step C and track's aircraft ID is the same as the target's aircraft ID. | |

TABLE 2 description of the meanings of various track types

| Track | Meanings |
|---|---|
| Search | The system uses primary radars to track the aircraft |
| Beacon | The system uses secondary radars to track the aircraft |
| Accurate | The system uses ADS-B data to track the aircraft |
| ADS | The system uses ADS-A data to track the aircraft |
| ADS-search | The system uses both primary radars and ADS-A to track the aircraft |
| ADS-beacon | The system uses both secondary radars and ADS-A to track the aircraft |
| ADS-accurate | The system uses both ADS-A and ADS-B data to track the aircraft |

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A tandem-cycle target/track assignment method used in a combined radar/automatic dependent surveillance (ADS) environment comprising the following steps:

(A) determining whether it is time to proceed to step (G); if not, going to step (B); otherwise going to step (G);

(B) filtering out improper targets;

(C) gating candidate tracks by selecting candidate tracks that potentially correlate with a reported target based on positions and velocities of the candidate tracks;

(D) according to the candidate tracks' type and correlation conditions, further filtering candidate tracks selected in step (C) and calculating likelihood values representing degrees of correlation with the reported target for remaining tracks, and saving all likelihood values of track-target pairs for later processing in step (G);

(E) determining whether tracks should be updated in steps (F) or (G) based on type of radar, track type, and correlation conditions; if tracks should be updated in step (F), going to step (F); otherwise going to step (G);

(F) selecting a system track whose likelihood value is highest and updating it with the reported target; and then going to step (A); and (G) batch processing acquired data by running an auction algorithm to select best track-target pairs and updating system tracks with their best targets; and then going to step (A).

2. The method of claim 1, wherein the time for carrying out said batch processing, as determined in step (A), is every 4.5 seconds.

3. The method of claim 1, wherein in step (B), the targets to be filtered out include: radar test targets, targets with an invalid beacon code, targets outside a system plane; and targets whose inclusion exceeds system capacity.

4. The method of claim 1, wherein in step (C), candidate tracks that can reach a reported target's position in a reasonable time are selected; and wherein step (C) further comprises the step of considering positions, velocities, headings, turn rates, correlation time of the candidate tracks.

5. The method of claim 1, wherein in Step (D), said likelihood values of candidate tracks selected in Step (C) are calculated by increasing an initial likelihood value when:

a distance between a respective one of said candidate tracks and the target is small;

a difference in velocity, heading, or altitude between the respective candidate track and the target is small;

a beacon code of the respective candidate track is the same as that of the target;

an aircraft identifier (ID) of the respective candidate track is the same as that of the target; and the respective candidate track and the target are both reported by a same primary or secondary radar;

and by decreasing the likelihood value if the target is reported by a primary radar and is in a clutter area, and wherein:

likelihood values of all {(candidate track, reported target)} pairs are saved for later processing in step (G); and if no candidate track can be found, a new track is initiated using the reported target.

6. The method of claim 1, wherein in step (D), if a target is reported by a primary radar and the candidate track's type is search, or ADS-search, when candidate tracks pass the gating in step (C), likelihood values of candidate tracks are calculated and step (G) is applied.

7. The method of claim 1, wherein in step (D), if a target is reported by a primary radar and candidate tracks' type are beacon or accurate, when candidate tracks pass the gating in step (C) and tracks are in coast state, target is not in clutter area, target is reported from preferred radar, likelihood values of candidate tracks are calculated while correlating them with the reported target and step (G) is applied.

8. The method of claim 1, wherein in step (D), if a target is reported by a primary radar and candidate tracks' types are ADS-beacon or ADS-accurate, these candidate tracks are not correlated with the reported target.

9. The method of claim 1, wherein in step (D), if a target is reported by a secondary radar and candidate tracks' types are search, these candidate tracks are not correlated with the reported target.

10. The method of claim 1, wherein instep (D), if a target is reported by a secondary radar and candidate track's type are beacon or ADS-beacon, when candidate tracks pass the gating in step (C) and beacon codes of the candidate tracks are the same as that of the target, or a beacon code of the target is HIJK or RDOF or EMRG, wherein codes HIJK, RDOF, and EMRG are codes respectively relating to hijacking, radio failure, and other emergencies, calculating said likelihood values of candidate tracks while correlating them with the reported target and then going to step (G).

11. The method of claim 1, wherein in step (D), if a target is reported by a secondary radar, and candidate track's type are accurate, ADS, ADS-search or ADS-accurate, when candidate tracks pass the gating in step (C) and the candidate tracks do not correlate with any secondary radar reported target, or beacon code of the candidate tracks is HIJK or RDOF or EMRG, wherein codes HIJK, RDOF, and EMRG are codes respectively relating to hijacking, radio failure, and other emergencies, calculating said likelihood values of candidate tracks while correlating them with the reported target and then going to step (G).

12. The method of claim 1, wherein in Step (D), if a target is reported by ADS-B and candidate tracks' types are search, these candidate tracks are not correlated with the reported target.

13. The method of claim 1, wherein in Step (D), if a target is reported by ADS-B and candidate tracks' types are beacon, accurate, ADS, ADS-search, ADS-beacon, or ADS-accurate, when the candidate track passes the gating in step (C) and track's aircraft ID is the same as that of the target, the likelihood value of the candidate track is calculated and step (F) is applied.

14. The method of claim 1, wherein in step (D), if a target is reported by ADS-A and candidate tracks' types are search, these candidate tracks are not correlated with the reported target.

15. The method of claim 1, wherein in step (D), if a target is reported by ADS-A and candidate tracks' types are beacon, accurate, ADS, ADS-search, ADS-beacon, or ADS-accurate, when the candidate track passes the gating in step (C) and track's aircraft ID is the same as that of the target, the likelihood value of the candidate track is calculated and step (F) is applied.

* * * * *